United States Patent
Daccord

(10) Patent No.: US 9,470,051 B2
(45) Date of Patent: *Oct. 18, 2016

(54) METHOD AND COMPOSITION TO PREVENT FLUID MIXING IN PIPE

(75) Inventor: Gerard Daccord, Vauhallan (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 876 days.

This patent is subject to a terminal disclaimer.

(21) Appl. No.: 13/395,654

(22) PCT Filed: Sep. 23, 2010

(86) PCT No.: PCT/EP2010/005837
§ 371 (c)(1),
(2), (4) Date: Apr. 8, 2012

(87) PCT Pub. No.: WO2011/038861
PCT Pub. Date: Apr. 7, 2011

(65) Prior Publication Data
US 2012/0186815 A1 Jul. 26, 2012

(30) Foreign Application Priority Data
Oct. 2, 2009 (EP) .................................. 09290761

(51) Int. Cl.
*E21B 21/00* (2006.01)
*C09K 8/40* (2006.01)
*C09K 8/42* (2006.01)

(52) U.S. Cl.
CPC .............. *E21B 21/00* (2013.01); *C09K 8/40* (2013.01); *C09K 8/424* (2013.01); *C09K 2208/08* (2013.01)

(58) Field of Classification Search
None
See application file for complete search history.

(56) References Cited

U.S. PATENT DOCUMENTS

| | | | | |
|---|---|---|---|---|
| 4,083,407 A | * | 4/1978 | Griffin et al. | 166/291 |
| 4,391,925 A | | 7/1983 | Mintz et al. | |
| 4,439,328 A | * | 3/1984 | Moity | 507/204 |
| 4,836,940 A | | 6/1989 | Alexander | |
| 5,027,900 A | * | 7/1991 | Wilson | 166/285 |

(Continued)

FOREIGN PATENT DOCUMENTS

| | | |
|---|---|---|
| EP | 0721050 | 7/1996 |
| EP | 0735235 | 10/2000 |

(Continued)

OTHER PUBLICATIONS

W. Burger, MJ Burge, "Digital Image Processing—An Algorithmic Introduction using Java", Springer, ISBN 978-1-84628-379-6 (2008), Index only.

(Continued)

*Primary Examiner* — Angela M DiTrani
*Assistant Examiner* — Anuradha Ahuja
(74) *Attorney, Agent, or Firm* — Jeremy D. Tillman; Michael Flynn; Tim Curington

(57) ABSTRACT

Fiber laden fluids may be used to separate two wellbore-service fluids as they travel through a tubular body, preventing their commingling. Such fluids obviate the need for mechanical devices such as wiper plugs, or special adjustment of the wellbore-service fluids' rheological properties. The wellbore-service fluids may be drilling fluids, spacer fluids, chemical washes, cement slurries, acidizing fluids, fracturing fluids, formation-consolidation fluids or gravel-pack fluids.

18 Claims, 3 Drawing Sheets

(56) References Cited

U.S. PATENT DOCUMENTS

| | | | |
|---|---|---|---|
| 5,330,005 A | 7/1994 | Card et al. | |
| 5,339,902 A | 8/1994 | Harris et al. | |
| 5,377,760 A * | 1/1995 | Merrill | 166/295 |
| 5,439,055 A * | 8/1995 | Card et al. | 166/280.2 |
| 5,501,274 A | 3/1996 | Nguyen et al. | |
| 5,501,275 A | 3/1996 | Card et al. | |
| 5,582,249 A | 12/1996 | Caveny et al. | |
| 5,697,440 A | 12/1997 | Weaver et al. | |
| 5,782,300 A * | 7/1998 | James et al. | 166/278 |
| 5,904,208 A * | 5/1999 | Ray et al. | 166/312 |
| 6,016,871 A | 1/2000 | Burts, Jr. | |
| 6,016,879 A | 1/2000 | Burts, Jr. | |
| 6,172,011 B1 | 1/2001 | Card et al. | |
| 6,218,343 B1 | 4/2001 | Burts, Jr. | |
| 6,221,152 B1* | 4/2001 | Dial et al. | 106/805 |
| 6,283,213 B1* | 9/2001 | Chan | 166/291 |
| 6,450,260 B1 | 9/2002 | James et al. | |
| 6,599,863 B1 | 7/2003 | Palmer et al. | |
| 6,716,798 B1 | 4/2004 | Burts, Jr. | |
| 6,732,800 B2 | 5/2004 | Acock et al. | |
| 6,837,309 B2 | 1/2005 | Boney et al. | |
| 6,867,170 B1 | 3/2005 | Burts, Jr. | |
| 6,927,194 B2 | 8/2005 | Burts, III | |
| 6,932,158 B2 | 8/2005 | Burts, III | |
| 6,938,693 B2 | 9/2005 | Boney et al. | |
| 6,939,833 B2 | 9/2005 | Burts, III | |
| 6,976,537 B1 | 12/2005 | Verret | |
| 7,275,596 B2 | 10/2007 | Willberg et al. | |
| 7,297,662 B2 | 11/2007 | Verret | |
| 7,306,041 B2 | 12/2007 | Milne et al. | |
| 7,350,572 B2 | 4/2008 | Fredd et al. | |
| 7,380,600 B2 | 6/2008 | Willberg et al. | |
| 7,380,601 B2 | 6/2008 | Willberg et al. | |
| 7,398,829 B2 | 7/2008 | Hutchins et al. | |
| 7,482,311 B2 | 1/2009 | Willberg et al. | |
| 2002/0040812 A1 | 4/2002 | Heying | |
| 2002/0157575 A1* | 10/2002 | DiLullo et al. | 106/711 |
| 2004/0020651 A1* | 2/2004 | Burts, III | 166/295 |
| 2004/0162356 A1 | 8/2004 | Willberg et al. | |
| 2004/0182577 A1* | 9/2004 | Chatterji et al. | 166/305.1 |
| 2005/0175654 A1 | 8/2005 | Willberg et al. | |
| 2006/0000612 A1* | 1/2006 | Reddy et al. | 166/293 |
| 2006/0042797 A1* | 3/2006 | Fredd et al. | 166/282 |
| 2006/0096759 A1* | 5/2006 | Reddy et al. | 166/295 |
| 2006/0157248 A1* | 7/2006 | Hoefer et al. | 166/300 |
| 2006/0174802 A1* | 8/2006 | Bedel et al. | 106/638 |
| 2006/0175060 A1* | 8/2006 | Reddy | 166/294 |
| 2006/0254770 A1* | 11/2006 | Hou | 166/291 |
| 2007/0056730 A1* | 3/2007 | Keese et al. | 166/291 |
| 2007/0129262 A1 | 6/2007 | Gurmen et al. | |
| 2007/0281869 A1 | 12/2007 | Druchon et al. | |
| 2008/0023205 A1* | 1/2008 | Craster et al. | 166/387 |
| 2008/0060811 A1* | 3/2008 | Bour et al. | 166/291 |
| 2008/0093073 A1 | 4/2008 | Bustos et al. | |
| 2008/0110627 A1* | 5/2008 | Keese et al. | 166/292 |
| 2008/0135242 A1 | 6/2008 | Lesko et al. | |
| 2008/0234147 A1 | 9/2008 | Li et al. | |
| 2008/0236832 A1 | 10/2008 | Fu et al. | |
| 2008/0245527 A1* | 10/2008 | Leugemors et al. | 166/280.1 |
| 2009/0032252 A1 | 2/2009 | Boney et al. | |
| 2009/0044945 A1* | 2/2009 | Willberg et al. | 166/308.1 |
| 2009/0054269 A1* | 2/2009 | Chatterji et al. | 507/104 |
| 2009/0095475 A1* | 4/2009 | Ravi et al. | 166/293 |
| 2010/0288495 A1* | 11/2010 | Willberg et al. | 166/278 |
| 2010/0307747 A1* | 12/2010 | Shindgikar et al. | 166/276 |
| 2012/0090842 A1 | 4/2012 | Daccord et al. | |
| 2012/0322695 A1* | 12/2012 | Kefi et al. | 507/118 |

FOREIGN PATENT DOCUMENTS

| | | |
|---|---|---|
| EP | 0619415 | 1/2002 |
| EP | 0783073 | 11/2002 |
| EP | 0834644 | 12/2004 |
| EP | 1165936 | 3/2006 |
| EP | 1789650 | 11/2008 |
| EP | 2085447 | 8/2009 |
| WO | 2005/059058 | 6/2005 |
| WO | 2006/003637 | 1/2006 |
| WO | 2009/079231 | 6/2009 |
| WO | 2009/079234 | 6/2009 |
| WO | 2009/083236 | 7/2009 |
| WO | 2009/083238 | 7/2009 |
| WO | 2009/088317 | 7/2009 |

OTHER PUBLICATIONS

Ahmed RM and Takach NE: "Fiber Sweeps for Hole Cleaning," Society of Petroleum Engineers Paper 113746 (Apr. 2008).

Alava M and Niskanen K: "The Physics of Paper," Rep. Prog. Phys. (2006) 69,669-723.

Daccord G, Guillot D and Nilsson F: "Mud Removal," in Nelson EB and Guillot D (eds.): Well Cementing—2nd Edition, Houston: Schlumberger (2006): 143-189.

Hubbe MA: "Flocculation and Redispersion of Cellulosic Fiber Suspensions: a Review of Effects of Hydrodynamic Shear and Polyelectrolytes," Review Articles, BioResources (2007) 2(2), 296-331.

Joung CG, Phan-Thein N and Fan XJ: "Viscosity of Curved Fibers in Suspension," J. Non-Newtonian Fluid Mechanics (2002) 102, 1-17.

Nigam M: "Challenges in Pulp Processing," 12th ERCOFTAC NPC Meeting, May 29-30, 2008, 1-19. Retrieved from the Internet: URL: http://www.mech.kth.se/ercoftac/events/NPC12/presentations/Thursday/Nigam.pdf [retrieved on Sep. 5, 2010].

Parker PN et al.: "An Evaluation of a Primary Cementing Technique Using Low Displacement Rates," paper SPE 1234 presented at the SPE Annual Meeting, Denver, Colorado, USA (Oct. 3-6, 1965).

Piot B and Cuvillier G: "Primary Cementing," in Nelson EB and Guillot D (eds.): Well Cementing—2nd Edition, Houston: Schlumberger (2006): 459-501.

Roussel N and Coussot P: "Fifty-Cent Rheometer for Yield-Stress Measurements: From Slump to Spreading Flow," J Rheology (May/Jun. 2005) 49(3), 705-718.

Xu H and Aidun CK: "Characteristics of Fiber Suspension Flow in a Rectangular Channel," International Journal of Multiphase Flow, 31 (Mar. 2005) 318-336.

Extended European Search Report issued in related European application No. 09290761.7 mailed Mar. 11, 2010 (7 pages).

International Search Report issued in related international application No. PCT/EP2010/005837 dated Apr. 13, 2011 (4 pages).

Written Opinion of the International Search Authority issued in related international application No. PCT/EP2010/005837 dated Apr. 13, 2011 (5 pages).

Communication pursuant to Article 94(3) EPC issued in related European application No. 09290761.7 mailed on Feb. 16, 2015 (3 pages).

Communication pursuant to Article 94(3) EPC issued in related European application No. 09290761.7 mailed on Aug. 16, 2012 (5 pages).

Communication pursuant to article 94(3) issued in related European application No. 09290761.7 mailed Jul. 29, 2011 (2 pages).

* cited by examiner

METHOD AND COMPOSITION TO PREVENT FLUID MIXING IN PIPE

BACKGROUND OF THE INVENTION

The statements in this section merely provide background information related to the present disclosure and may not constitute prior art.

The present invention is related in general to fluid compositions and methods for servicing subterranean wells. Particularly, the invention relates to the use of fluids containing fibers to separate two wellbore-service fluids as they travel through a tubular body. Such fluids are also referred to as "fiber-laden fluids."

Well-servicing operations frequently involve the pumping and placement of fluids in the wellbore. In many cases, different fluids are pumped through tubulars in a sequence. Perhaps the most common example is primary well cementing, during which the fluid sequence may involve drilling fluid, followed by a spacer fluid, and then followed by one or more cement-slurry formulations. It is desirable to minimize or prevent commingling of the fluids for two principal reasons. First, mixing of fluids at their interfaces reduces their useful volumes. Second, the fluids may be incompatible, leading to unwanted rheological consequences such as gelation. The fluid mixture may viscosify, increasing the friction pressure during pumping. Or, one fluid may penetrate the interface of the other, forming channels. Maintaining the integrity of the cement slurry is of great importance, because contamination may significantly alter the rheological performance, preventing proper placement in the annulus. In addition, the ability of the set cement to provide zonal isolation may be compromised.

Several techniques are available to isolate or minimize the commingling of fluids as they travel through tubulars. The methods fall into two principal categories: hydrodynamic or mechanical.

Hydrodynamic techniques involve adjusting the rheological properties of the fluids and the pumping rate. The aim is to achieve a flow regime that will minimize commingling. If both fluids are in turbulent flow during placement, mixing at the interface will be minimized. However, if the fluids are incompatible, even minimal mixing may increase the viscosity at the interface, causing the fluid in the mixing zone to assume laminar-flow, and exacerbating further mixing and contamination. If turbulent flow is not feasible, the fluids may be designed to have significantly different gel strengths, and the pumping rate may be reduced so that both fluids are in plug flow during placement. The flat interface between the fluids that is characteristic of plug flow, coupled with the gel-strength differential, discourages mixing. In many cases either technique may not be feasible because formulating the fluids to achieve a desired flow regime may negatively impact other critical aspects of fluid performance. In addition, the necessary pumping rates may not be optimal with respect to other well engineering parameters.

Mechanical methods are more frequently employed to achieve isolation between fluids, the most common being wiper plugs and foam balls. These devices effectively prevent mixing during displacement; however, special hardware at the wellhead is required to deploy them, and additional hardware must be installed at the exit of the conduit to hold them in place after arrival. In addition, working with these devices is time consuming. Finally, the tubular string often consists of sections with multiple diameters, and complex assemblies are required to ensure that the mechanical devices are adapted to the current diameter.

It therefore remains desirable to provide means to isolate two fluids and prevent mixing, without the need to adjust the fluids' rheological properties, without the need to provide special hardware at the wellsite, and without regard to tubular-diameter changes.

SUMMARY OF THE INVENTION

The present invention solves the problems mentioned herein.

In a first aspect, embodiments relate to using a fiber-laden liquid suspension to separate two wellbore-service fluids. By fiber laden, it is to be understood, in the context of the present invention, that the fluid contains fibers. The fiber concentration, length and diameter are chosen such that the fiber-laden fluid exhibits yield stress sufficient to flow as a plug. The yield stress arises from fiber entanglement. The entanglement may be disrupted by hydrodynamic forces such as those at the entrance of nozzles, but it instantaneously reforms when the forces disappear. This feature enables the fiber suspension to flow through restrictions without plugging them.

The yield stress of the fiber-laden plug fluid is sufficiently high to prevent dilution of the first and second wellbore-service fluids, and maintain separation as they travel through the tubular body. Therefore, there is no need to specially adjust the rheological properties or displacement rate of either wellbore-service fluid. The plug fluid is prepared and handled on the surface in a manner similar to other wellbore-service fluids; therefore, no special mechanical equipment is required on the surface for deployment, nor are any special devices necessary on the tubular body itself. The plug-system fluidity also enables automatic and instant adjustment to tubular-geometry fluctuations during the journey downhole.

The first wellbore-service fluid is pumped into the tubular body. Next, a volume of fiber-laden fluid sufficient to provide at least 2 meters of separation, and most preferably at least 10 meters, between the two wellbore-service fluids is pumped behind the first wellbore-service fluid. Then the fiber-laden fluid is followed by the second wellbore-service fluid. Upon exiting the tubular body, the fiber-laden fluid becomes dispersed and has no further role to play.

The plug fluid may be (but is not limited to) a bentonite suspension, water-soluble-polymer solution (linear or cross-linked), oil-base fluid, water-in-oil emulsion, oil-in-water emulsion or water-in-water emulsion containing fibers chosen from a variety commonly used in the oilfield. These fibers include (but are not limited to) natural and synthetic organic fibers, glass fibers, ceramic fibers, carbon fibers, inorganic fibers, metallic fibers and mixtures thereof. The fibers may be linear or curved, with lengths between about 6 mm and 200 mm and diameters from about 25 micrometers and about 300 micrometers. It is to be understood that the term linear means "extending along a straight or nearly straight line." To achieve sufficient fiber entanglement to develop yield stress, the fiber concentration, length and diameter are chosen such that the "crowding factor," defined later in this document, exceeds about 50.

To further promote dispersion of the fiber-laden plug fluid as it exits the tubular body, an encapsulated chemical may be added to destroy the fiber network. The capsules release the chemical upon shearing as the fluid exits the tubular body through nozzles or other restrictions between the tubular body and the environment outside the tubular body. The encapsulated chemical may include a fast hydrating polymer that would increase the base-fluid viscosity and weaken the fiber cohesion.

In a further aspect, embodiments relate to methods for cementing a subterranean well. The first wellbore-service fluid is preferably drilling fluid, and the second wellbore-service fluid is preferably a cement slurry. Drilling fluid is circulated through the tubular body and back through the annulus between the tubular body and the wellbore wall or another previously installed tubular body. A fiber-laden plug fluid conforming to the specifications outlined in the preceding paragraphs is selected and pumped into the tubular body behind the drilling fluid. The fiber-laden plug is then followed by a cement slurry, which is pumped into the tubular body and, after exiting the tubular body, travels into the annulus between the tubular body and the wellbore wall. Alternatively, a spacer fluid, chemical wash or both may precede the cement slurry behind the fiber-laden plug.

In yet another aspect, embodiments relate to compositions for controlling the interface between two fluids. The composition comprises a fluid and fibers. The fibers may be linear, curved or both. The fiber concentration, length and diameter are chosen such that the crowding factor exceeds about 50. The length of the fibers is between about 6 mm and 50 mm, and the fiber diameter is between about 25 micrometers and 300 micrometers.

Although primary well cementing is the principal envisioned application of this technology, other well treatments involving fluids pumped in a sequence may also benefit. Such treatments include (but are not limited to) remedial cementing, matrix acidizing, hydraulic fracturing, formation consolidation and gravel packing.

DETAILED DESCRIPTION

Figure 1:
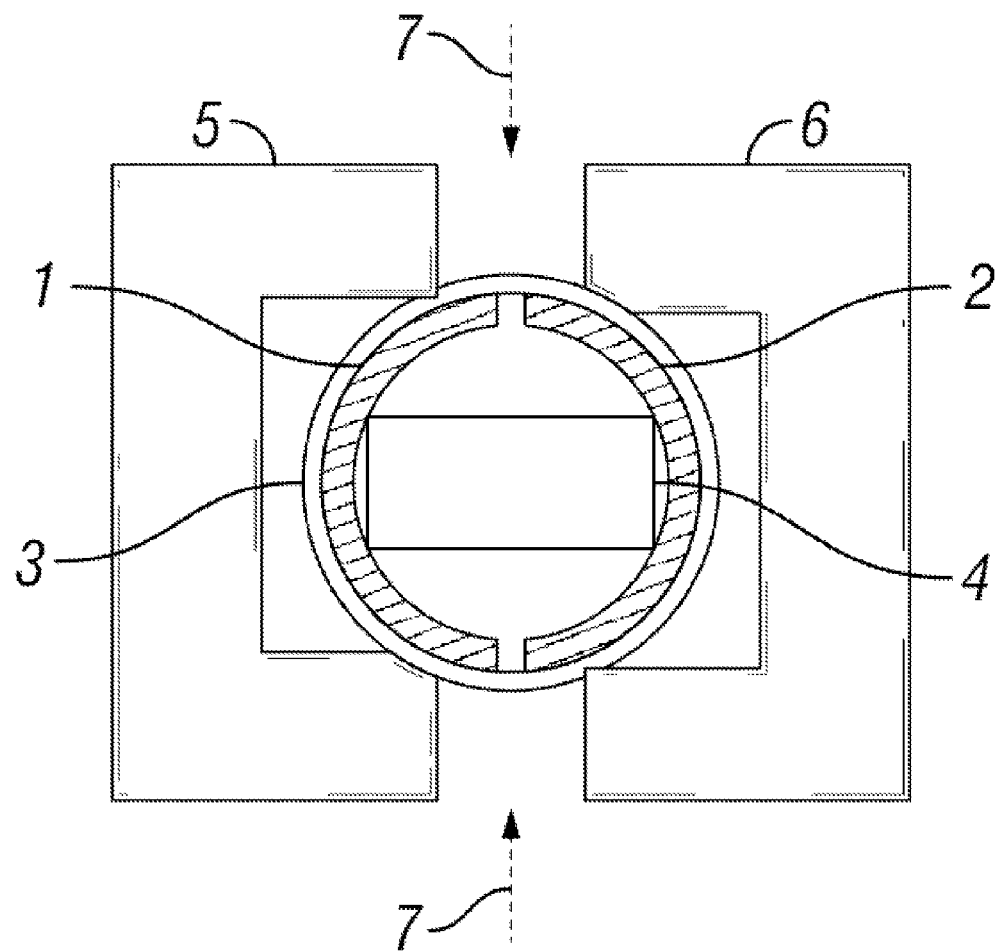
FIG. 1 is a cross-sectional diagram of the apparatus constructed by the inventors to prepare curved fibers described in the examples.

The invention provides methods and a composition for separating two wellbore-service fluids as they travel through a tubular body The invention may be described in terms of treatment of vertical wells, but is equally applicable to wells of any orientation. The Invention may be described for hydrocarbon production wells, but it is to be understood that the Invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

In the following text, the term "fiber laden" is to be understood, in the context of the present invention, as "containing fibers."

In an aspect, embodiments relate to methods for using a fiber-laden liquid suspension to separate two wellbore-service fluids. The fibers are present at a concentration sufficient to impart high yield stress to the suspension. The yield stress arises from the fibers becoming entangled. The entanglement may be disrupted by hydrodynamic forces such as those at the entrance of nozzles in the drill bit, but it instantaneously reforms when the forces disappear. This feature enables the fiber suspension to flow through restrictions without plugging them.

The wellbore-service fluids may be one or more members of the list comprising drilling fluids, spacer fluids, chemical washes, cement slurries, acidizing fluids, fracturing fluids, formation-consolidation fluids and gravel-pack fluids.

The yield stress of the fiber-laden plug fluid is sufficiently high to prevent dilution of the first and second wellbore-service fluids, and maintain separation as they travel through the tubular body. Therefore, there is no need to specially adjust the rheological properties or displacement rate of either wellbore-service fluid. The plug fluid is prepared and handled on the surface in a manner similar to other wellbore-service fluids; therefore, no special mechanical equipment is required on the surface for deployment, nor are any special devices necessary on the tubular body itself. The plug-system fluidity also enables automatic and instant adjustment to tubular-geometry fluctuations during the journey downhole.

The first wellbore-service fluid is pumped into the tubular body. Next, a volume of fiber-laden fluid sufficient to provide a separation between the two wellbore-service fluids is pumped behind the first wellbore-service fluid. Preferably, the volume of the fiber-laden fluid is sufficient to provide a separation of at least 2 meters, more preferably at least 4 meters, even more preferably at least 6 meters and most preferably at least 10 meters. Then the fiber-laden fluid is followed by the second wellbore-service fluid. Upon exiting the tubular body, the fiber-laden fluid becomes dispersed and has no further role to play.

The plug fluid may be (but is not limited to) a bentonite suspension, water-soluble-polymer solution (linear or cross-linked), oil-base fluid, water-in-oil emulsion, oil-in-water emulsion or water-in-water emulsion containing fibers chosen from a variety commonly used in the oilfield. These fibers include (but are not limited to) natural and synthetic organic fibers, glass fibers, ceramic fibers, carbon fibers, inorganic fibers, metallic fibers and mixtures thereof. The fibers may be linear or curved, with lengths between about 6 mm and 50 mm, more preferably between 6 mm and 25 mm and most preferably between 10 mm and 20 mm. Fiber diameters from about 25 to about 300 micrometers may be employed; however, diameters between 100 and 300 micrometers are more preferred and diameters between 200 and 280 micrometers are most preferred. To achieve sufficient fiber entanglement to develop sufficient yield stress, the fiber length, diameter and concentration in the suspension are chosen such that the "crowding factor" exceeds about 50.

The crowding factor is given by Eq. 1.

$$N_{cr} = \frac{2}{3} C_v \left(\frac{L}{d}\right)^2, \qquad \text{(Eq. 1)}$$

where $N_{cr}$ is the crowding factor, $C_v$ is the fiber-volume concentration, L is the length of the fibers and d is the diameter of the fibers. The crowding factor is independent of fiber shape. At crowding factors above about 50, the resulting fluid possesses sufficient yield stress to cause it to flow as a plug; therefore, the velocity profile is flat as it travels through the tubular body. This behavior leads to two principal consequences: (1) the first wellbore-service fluid is displaced in a more efficient manner, with limited mixing; and (2) fluid left on the wall will be removed by the plug because of the high velocity gradient at the wall Compared to classical yield-stress fluids such as crosslinked polymer gels, fiber suspensions present a number of advantages. Fiber entanglement originates from mechanical forces, lowering the sensitivity to the chemical environment or temperature. The fiber entanglement may be destroyed by high elongational flow—such as that occurring at restrictions—and reform at the exit as the stress is withdrawn. By contrast, gels based on chemical crosslinks are frequently sensitive to shear.

Linear fibers, curved fibers or both may be employed to prepare an effective plug fluid. However, curved fibers tend to interact more strongly with one another, improving fiber entanglement.

To further promote dispersion of the fiber-laden plug fluid as it exits the tubular body, an encapsulated substance may be added that will act to destroy the fiber entanglement. The capsules release the chemical upon shearing as the fluid exits the tubular body. The encapsulated substance may include a fast hydrating polymer that would increase the base-fluid viscosity and weaken the fiber cohesion. The encapsulated substance may also include a chemical or enzyme that degrades the fibers, the base fluid or both.

In a further aspect, embodiments relate to methods for cementing a subterranean well. The first wellbore-service fluid is drilling fluid, and the second wellbore-service fluid is a cement slurry. Drilling fluid is circulated through the tubular body and back through the annulus between the tubular body and the wellbore wall. A fiber-laden plug fluid conforming to the specifications outlined in the preceding paragraphs is selected and pumped into the tubular body behind the drilling fluid. The fiber-laden plug is then followed by a cement slurry, which is pumped into the tubular body and, after exiting the tubular body, travels into the annulus between the tubular body and the wellbore wall. Alternatively, a spacer fluid, chemical wash or both may precede the cement slurry behind the fiber-laden plug.

In yet another aspect, embodiments relate to compositions for controlling the interface between two fluids. The composition comprises a fluid and fibers. The fibers may be linear, curved or both. The fiber concentration, length and diameter are chosen such that the crowding factor exceeds about 50, the length of the fibers is between about 6 mm and 50 mm, and the fiber diameter is between about 25 micrometers and 300 micrometers.

Although primary well cementing is the principal envisioned application of this technology, other well treatments involving fluids pumped in a sequence may also benefit. Such treatments include (but are not limited to) matrix acidizing, hydraulic fracturing, formation consolidation and gravel packing.

EXAMPLES

The present invention may be further understood from the following examples.

The fiber used in the examples given below was DuPont TYNEX 612. TYNEX 612 is a polyamide fiber. The density is 1.067 g/cm³, the fiber diameter varies from 280-310 micrometers, the melting temperature is about 210° C. and the Young's modulus is about 3 GPa.

Both linear and curved fibers were tested. The length of the linear fibers was 20.8 mm±1.6 mm. Curved fibers are characterized by their Feret length and their curvature. The Feret length is the straight-line distance between each end of the fiber. The curvature is the angle between straight lines drawn from the center of the fiber curve and the ends of each segment. In the following examples, the Feret length was 20.2 mm±1.6 mm and the curvature was 80°, corresponding to a circle diameter of about 31 mm.

The curved fibers were prepared with a device constructed by the inventor, depicted in FIG. 1. The procedure is given below.
1. Choose a continuous fiber filament.
2. Wrap the filament 3 around the two half cylinders 1 and 2. Adjust the spacing rod 4 to achieve the desired cylinder diameter. In these examples, the cylinder diameter was 12 mm.
3. Place the cylinder and coiled fiber in an armature comprising two brackets 5 and 6 to hold the fiber in place.
3. Heat the cylinder and filament to a temperature within the workability range of the fiber composition. The workability range is generally between the softening temperature and the melting temperature of the fiber. If the fiber composition does not melt, the workability range is between the softening temperature and the decomposition temperature. In the examples, the TYNEX 612 fibers were heated to 150° C.
4. Quench the system to room temperature.
5. Hold the coiled fiber and make two cuts 180° apart 7 along the length of the cylinder.
6. Free the cut fibers. Their length is half the cylinder perimeter, and their shape is close to being semi-circular.

The yield stress of fiber-laden suspensions was measured with an Abrams cone, described in ASTM Standard C143. This device is commonly used to measure the yield stress of concretes. The cone is filled with the sample fluid. The cone is then lifted and the fluid spreads out. Analysis of the size and shape of the spread fluid reveals rheological information. The yield stress of a sample fluid is given by Eq. 2.

$$\tau_y = \frac{225}{128} \frac{\rho g \Omega^2}{\pi^2 R^5}, \qquad \text{(Eq. 2)}$$

where $\rho$ is the bulk fluid density, g is the acceleration of gravity, R is the radius of the spread fluid and $\Omega$ is the cone volume equal to $$\Omega = \frac{\pi H}{12}(r_1^2 + r_2^2 + r_1 r_2). \qquad \text{(Eq. 3)}$$

H is the cone height, and $r_1$ and $r_2$ are the radii of the top and bottom sections. For the following examples, the cone dimensions and volume were: H=15 cm; $r_1$=2.5 cm; $r_2$=5 cm; Ω=689 cm$^3$.

The procedure used to monitor the yield stress is given below.
1. A volume of fiber suspension slightly larger than the cone volume is prepared, so that most of the mixed material will be poured into the cone.
2. The fiber suspension is manually mixed in a beaker until it appears to be homogeneous.
3. The cone is placed at the middle of a clean and uniform plane plate. Preferably, scale bars are drawn directly on the plate.
4. The fiber suspension is poured into the cone up to the top end. Care must be taken to obtain repeatable top levels. While pouring the fluid, the cone must be firmly held down against the plate to minimize leakage out of the bottom.
5. The assembly is left static for 10 minutes. This duration corresponds to the common "10-min gel strength" measurement employed by oilfield personnel.
6. The cone is slowly raised to minimize inertial effects.
7. Photographs of the spread suspension are taken, on which the scale bars must be visible, allowing measurement of the spread radius by image analysis.

The image analysis software was ImageJ, developed by the US National Health Institute. Additional information concerning ImageJ may be obtained in the following reference: Burger W and Burge M J: *Digital Image Processing—An Algorithmic Introduction using Java*, Springer, ISBN: 978-1-84628-379-6 (2008).

Example 1

Figure 2:
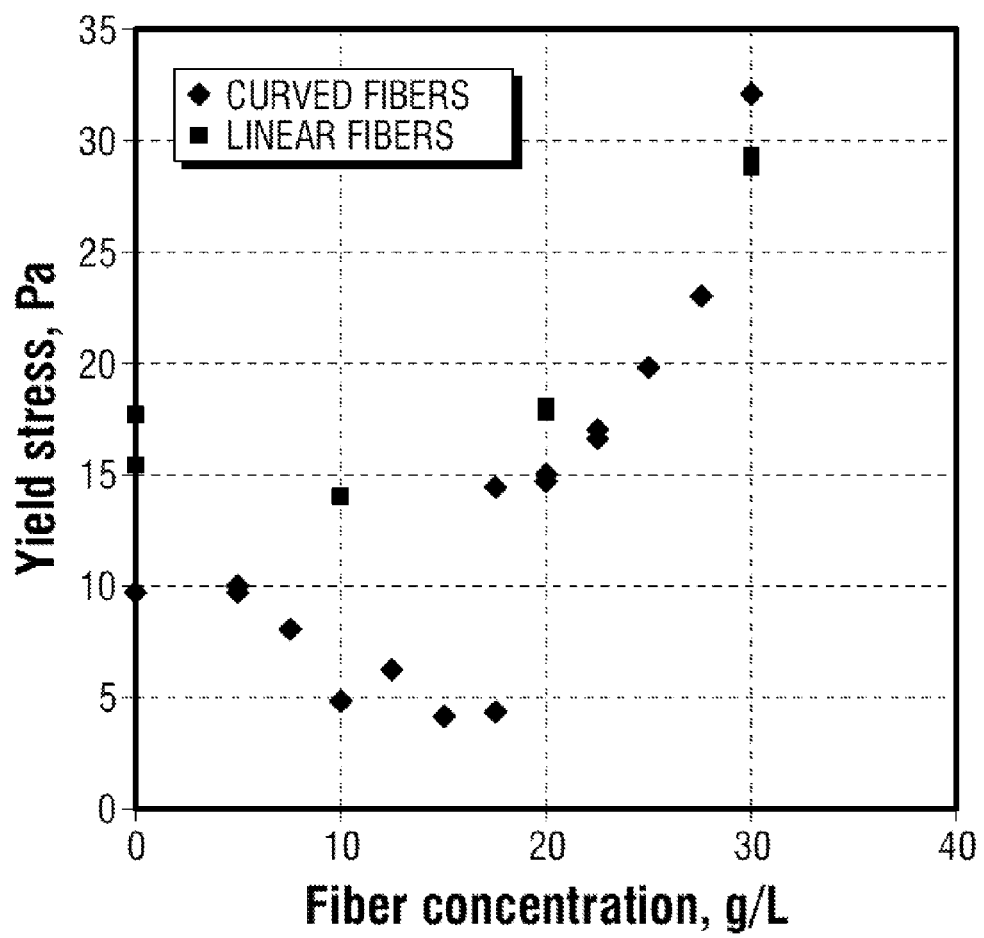
FIG. 2 is a plot showing the effect of adding linear or curved fibers on the yield stress of a 90-g/L bentonite suspension.

A 90-g/L suspension of bentonite in water was prepared as the plug base fluid. Fluids containing various amounts of either linear or curved fibers (up to 30 g/L) were placed in the Abrams cone, the spread radius was measured and the yield stress was calculated. The results are shown in FIG. 2. A significant yield-stress increase was observed at fiber concentrations above about 0.20 g/L. This concentration corresponds to a crowding number close to 50.

Example 2

Figure 3:
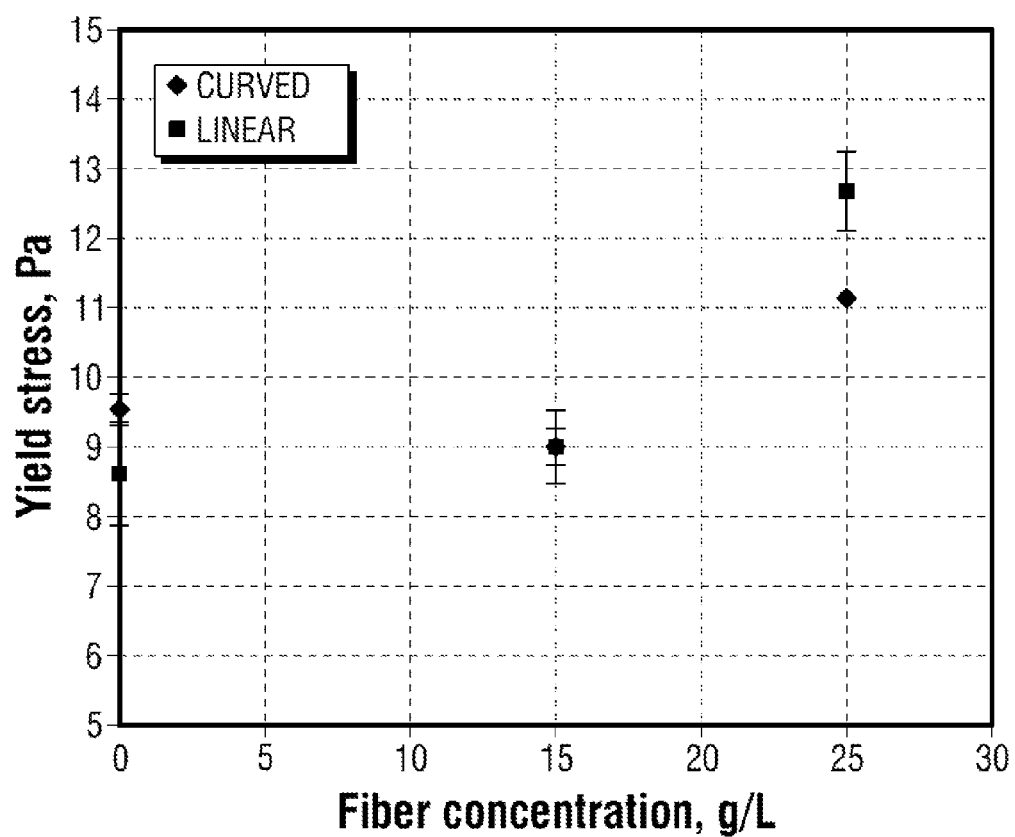
FIG. 3 is a plot showing the effect of adding linear or curved fibers on the yield stress of a 100-g/L bentonite suspension.

A 100-g/L suspension of bentonite in water was prepared as the plug base fluid. Fluids containing various amounts of either linear or curved fibers (up to 30 g/L) were placed in the Abrams cone, the spread radius was measured and the yield stress was calculated. The results are shown in FIG. 3. A significant yield-stress increase was again observed at fiber concentrations above about 20 g/L.

The invention claimed is:

1. A method of controlling a physical interface between two wellbore-service fluids inside a tubular body, thereby minimizing commingling of the wellbore-service fluids during displacement, comprising:
   i. selecting a fiber-laden plug fluid having a yield stress, wherein the fiber concentration, length and diameter are chosen such that the crowding factor exceeds 50;
   ii. pumping a first wellbore-service fluid through a tubular body inside a wellbore;
   iii. pumping a volume of the fiber-laden plug fluid into the tubular body behind the first wellbore-service fluid; and
   iv. pumping a second wellbore-service fluid into the tubular body behind the fiber-laden plug fluid,
   wherein control of the yield stress of the fiber-laden plug fluid is provided solely by fiber entanglement.

2. The method of claim 1, wherein the wellbore-service fluids are selected from the list comprising drilling fluids, spacer fluids, chemical washes, cement slurries, acidizing fluids, fracturing fluids, formation-consolidation fluids and gravel-pack fluids.

3. The method of claim 1, wherein the plug-fluid volume is sufficient to provide at least 2 meters separation inside the tubular body between the first and second wellbore-service fluids.

4. The method of claim 1, wherein the plug fluid comprises one or more members of the list comprising natural and synthetic organic fibers, glass fibers, ceramic fibers, carbon fibers, inorganic fibers and metallic fibers.

5. The method of claim 1, wherein the plug fluid comprises linear fibers, curved fibers or both.

6. The method of claim 1, wherein the fiber length is between about 6 mm and 50 mm.

7. The method of claim 1, wherein the fiber diameter is up to about 300 micrometers.

8. The method of claim 1, wherein the fiber concentration is higher than about 20 g/L.

9. The method of claim 1, wherein the plug fluid comprises one or more members of the list comprising: a bentonite suspension, a linear water-soluble-polymer solution, a crosslinked water-soluble polymer solution, oil-base fluid, water-in-oil emulsion, oil-in-water emulsion and a water-in-water emulsion.

10. The method of claim 1, further comprising the addition of an encapsulated substance to the fiber-laden plug fluid that, upon experiencing shear when exiting the tubular body, is released into the fiber-laden plug fluid, destabilizing the fiber entanglement and dispersing the fiber-laden plug fluid.

11. A method of cementing a subterranean well, comprising:
    i. selecting a fiber-laden plug fluid having a yield stress, wherein the fiber concentration, length and diameter are chosen such that the crowding factor exceeds 50;
    ii. pumping and circulating drilling fluid through a tubular body inside a wellbore having a wall and back through an annulus between the tubular body and the wellbore wall;
    iii. pumping a volume of the fiber-laden plug fluid into the tubular body behind the drilling fluid; and
    iv. pumping a cement slurry into the tubular body behind the fiber-laden plug fluid, and circulating the cement slurry so that it exits the tubular body and travels into the annulus between the tubular body and the wellbore wall, or between the tubular body and another previously installed tubular body,
    wherein control of the yield stress of the fiber laden plug fluid is provided solely by fiber entanglement.

12. The method of claim 11, wherein the plug-fluid volume is sufficient to provide at least 2 meters separation inside the tubular body between the drilling fluid and the cement slurry.

13. The method of claim 11, further comprising pumping a spacer fluid, chemical wash or both between the fiber-laden plug fluid and the cement slurry.

14. The method of claim 11, wherein the fiber length is between about 6 mm and 50 mm.

15. The method of claim 11, wherein the fiber diameter is between about 25 and about 300 micrometers.

16. The method of claim 11, wherein the fiber concentration is higher than about 20 g/L.

17. The method of claim 11, wherein the plug fluid comprises one or more members of the list comprising: a bentonite suspension, a linear water-soluble-polymer solution, a crosslinked water-soluble polymer solution, oil-base fluid, water-in-oil emulsion, oil-in-water emulsion and a water-in-water emulsion.

18. The method of claim 11, wherein the plug fluid comprises one or more members of the list comprising natural and synthetic organic fibers, glass fibers, ceramic fibers, carbon fibers, inorganic fibers and metallic fibers.

* * * * *